United States Patent [19]

Pecsok

[11] Patent Number: 4,615,850

[45] Date of Patent: Oct. 7, 1986

[54] FOAMABLE POLYVINYLIDENE FLUORIDE AND METHODS

[75] Inventor: Roger L. Pecsok, Berwyn, Pa.

[73] Assignee: Pennwalt Corporation, Philadelphia, Pa.

[21] Appl. No.: 630,924

[22] Filed: Jul. 16, 1984

[51] Int. Cl.[4] .............................................. B29D 7/00
[52] U.S. Cl. .................................... 264/45.9; 264/54; 264/DIG. 5; 521/60; 521/79; 521/82; 521/86; 521/89; 521/92; 521/94; 521/97
[58] Field of Search ..................... 521/79, 92, 86, 97, 521/60, 82, 89, 94; 264/45.9, 54, DIG. 5

[56] References Cited

U.S. PATENT DOCUMENTS

| | | | |
|---|---|---|---|
| 3,305,496 | 2/1967 | Riley, Jr. et al. | 521/145 |
| 3,321,413 | 5/1967 | Riley, Jr. et al. | 521/145 |
| 3,868,337 | 2/1975 | Gros | 521/145 |
| 3,983,080 | 9/1976 | Suh | 521/145 |
| 4,425,443 | 1/1984 | Georlette et al. | 521/79 |

*Primary Examiner*—Morton Foelak

[57] ABSTRACT

Foamable and foamed polyvinlyidene fluoride materials prepared by compounding the PVDF with a suitable nucleating agent of discreet insoluble particles, a blowing agent having an activation temperature above the melting point of the PVDF, and a dispersing aid to provide a substantially homogeneous powdered mixture that is then melt compounded with high shear melt blending means and then extruded and quenched to provide the foamable polyvinlyidene fluoride material which can then be extruded as an insulating material on wire at a temperature sufficiently high to activate the blowing agent.

16 Claims, No Drawings

FOAMABLE POLYVINYLIDENE FLUORIDE AND METHODS

BACKGROUND OF THE INVENTION

This invention relates to foamable polyvinylidene fluoride that is useful in forming insulation for electrical wire as well as cable jacketing for such insulated wires.

Usage of polyvinylidene fluoride (PVDF) and copolymers containing a major proportion of PVDF in wire insulation and cable jacketing has grown recently because the relatively low flammability and smoke generation of PVDF permits insulation in plenum ductwork without the need for a costly conduit covering. Accordingly, overall costs and economics of PVDF plenum wiring cable is thus competitive with less expensive insulation materials such as polyvinyl chloride which require conduit shrouding.

The inherently high dielectric constant for PVDF (8-10) renders it unsuitable normally for applications such as wire insulation in long length telephone cables where a low dielectric constant is essential to minimize cross-talk interference. Typical polyvinyl chloride compounds which are currently used have dielectric constants in the 3 to 3.5 range. Through the practice of the instant invention the dielectric constant of PVDF can be reduced to a comparable level by foaming the PVDF material during the wire coating process. The log of the dielectric constant of the foamed PVDF structure is directly proportional to the volume fraction of PVDF with the remainder of the volume being air spaces provided by the foaming process. A PVDF foam with 55% void content has a dielectric constant of about 3.5 and is therefore suitable for many wire insulation applications, including long length telephone primaries.

BRIEF SUMMARY OF THE INVENTION

The method of the invention relating to production of a foamable PVDF material is defined as a method for producing a foamable polyvinylidene fluoride material suitable for forming foamed electrical wire insulation having a dielectic constant of less than about 5.0, comprising:

(a) blending in an intensive powder blender a mixture of
  (i) a polymer selected from the group of polymers consisting essentially of a homopolymer of polyvinylidene fluoride, copolymers or terpolymers containing a major portion of vinylidene fluoride with at least one copolymerizable monomer selected from the group consisting essentially of hexafluoropropylene, trifluoroethylene, chlorotrifluoroethylene and tetrafluoroethylene and mixtures of the homopolymer, copolymer, and terpolymer;
  (ii) 0.05 to 5.0 percent by weight of the polymer of (i) of a nucleating agent of discreet, insoluble particles having a size distribution whose average length in the longest dimension of less than about 5 microns;
  (iii) 0.05 to 5.0 percent by weight of the polymer of (i) of a blowing agent having an activation temperature that is above the meltng point of said polymer but below the decomposition temperature of said polymer;
  (iv) 0.05 to 5.0 percent by weight of the polymer of (i) of a dispersing aid selected from the group of dispersing aids consisting essentially of dialkyl phthalate, dibutoxyethyl phthalate, diisononyl phthalate, ditridecyl phthalate, dicyclohexyl phthalate, diphenyl alkyl adipate, methyl phthalyl ethyl glycolate, and diethylene glycol monobutyl ether;
  to provide a substantially homogeneous powdered mixture;

(b) melt compounding the substantially homogeneous powdered mixture of (a) with high shear melt blending means while maintaining the temperature of the mixture below the activation temperature of the blowing agent to provide a substantially homogeneous melted blend of the mixture of (a); and then (c) extruding and quenching the melted mixture of (b) to provide the foamable polyvinylidene fluoride material.

It is preferred that the polymer include at least 70 mole percent of polyvinylidene fluoride monomer units. Preferably the average size distribution of the length of the nucleating agent is less than about 2 microns length in the longest dimension. Preferred nucleating agents are calcium carbonate, magnesium oxide, lead oxide, barium oxide, titanium oxide, antimony oxide, magnesium carbonate, lead carbonate, zinc carbonate, barium carbonate, carbon black, graphite, alumina, calcium silicate, molybdenum disulfide, magnesium hydroxide, aluminosilicate, calcium metasilicate, and calcium sulfate. It is preferred that the blowing agent be present in an amount of less than about 3 percent by weight of the polymer and that the agent have an activation temperature greater than about 220° C. The most preferable blowing agent is diisopropyl hydrazodicarboxylate and the preferred dispersing aid is dibutyl phthalate or dioctyl phthalate.

The blowing agent is defined as a compound having the formula ROOC—HN—NH—COOR' wherein at least one of R and R' is selected from the group consisting of secondary and tertiary alkyl groups having from 3 to 5 carbon atoms and the other of R and R' is selected from the group consisting of straight-chain and branched-chain alkyl groups having from 1 to 8 carbon atoms, cycloalkyl radicals having from 5 to 8 carbon atoms, aryl radicals having from 6 to 10 carbon atoms, and alkaryl and aralkyl radicals having from 7 to 10 carbon atoms.

As an alternative, the nucleating agent and the dispersing aid can be pre-blended prior to forming the mixture of (a).

Twin screw compounding means are the preferred means for melt compouding the substantially homogeneous powdered mixture of (a).

After step (c) it is preferred that the foamable polyvinlyidene fluoride material be chopped to form pellets.

The method of the invention to provide foamed material is the method as above defined wherein after step (c) the material is heated under sufficient pressure to prevent foaming to a temperature of at least the activation temperature of the blowing agent and then releasing the pressure to provide foamed material.

The method of the invention for providing an electrical insulating sheath of foamed material on a wire is as above described wherein after step (c) the foamable material is heated to a temperature of at least the activation temperature of the blowing agent under sufficient pressure to prevent foaming in an extruder and the heated material is extruded through an electrical wire coating die to provide an insulated wire having an electrical insulating sheath of foamed material on the wire.

The product of the invention includes the foamable polyvinylidene fluoride material, the foamed polyvinlydene fluoride material and an electrical wire insulated with the foamed material made in accordance with the processes as above stated. It is preferred that the foamed material have a dielectric constant of less than about 4.0 and that the insulated wire have a dielectric strength greater than 2 kilovolts.

The foamable PVDF product of this invention is defined as a foamable polyvinlyidene fluoride material suitable for forming foamed electrical wire insulation having a dielectic constant of less than about 5.0, consisting essentially of a substantially homogenous mixture of
(a) a polymer selected from the group of polymers consisting essentially of a homopolymer of polyvinylidene fluoride, copolymers or terpolymers containing a major portion of vinylidene fluoride with at least one copolymerizable monomer selected from the group consisting essentially of hexafluoropropylene, trifluoroethylene, chlorotrifluoroethylene and tetrafluoroethylene and mixtures of the homopolymer, copolymer, and terpolymer;
(b) 0.05 to 5.0 percent by weight of the polymer of (a) of a nucleating agent of discreet, insoluble particles having a size distribution whose average length is less than about 5 microns length in the longest dimension;
(c) 0.05 to 5.0 percent by weight of the polymer of (a) of a blowing agent having an activation temperature that is above the melting point of said polymer but below the decomposition temperature of said polymer; and
(d) 0.05 to 5.0 percent by weight of the polymer of (a) of a dispersing aid selected from the group of dispersing aids consisting essentially of dialkyl phthalate, dibutoxyethyl phthalate, diisononyl phthalate, ditridecyl phthalate, dicyclohexyl phthalate, diphenyl alkyl adipate, methyl phthalyl ethyl glycolate, and diethylene glycol monobutyl ether.

It is preferred that the polymer include at least 70 mole percent of polyvinylidene fluoride monomer units and that the nucleating agent average size distribution is of less than about 2 microns length in the longest dimension.

The other preferred materials for the foamable product of the invention are as above defined with respect to the process for preparing the foamable product of the invention.

The foamed product of the invention is defined as a foamed polyvinylidene fluoride material consisting essentially of a polymer selected from the group of polymers consisting essentially of a homopolymer of polyvinylidene fluoride, copolymers or terpolymers containing a major portion of vinylidene fluoride with at least one copolymerizable monomer selected from the group consisting essentially of hexafluoropropylene, trifluoroethylene, chlorotrifluoroethylene and tetrafluoroethylene and mixtures of the homopolymer, copolymer, and terpolymer; said polymer having from 0.05 to 5.0 percent by weight of the polymer of a nucleating agent of discreet, insoluble particles whose average size distribution is less than about 5 microns in the longest dimension dispersed throughout the polymer; said material having a void content within the range of 35% to 55% with a corresponding density of about 1.15 to 0.80 g/cc.

It is preferred that the average cell size longest dimension of the foamed material of the invention be within the range of about 0.5 to 1 mil. and that the polymer include at least 70 mole percent of polyvinlyidene fluoride monomer units. The nucleating agent of the foamed product preferably has an average size distribution in the longest dimension of less than about 2 microns and is preferably a nucleating agent selected from the group consisting essentially of calcium carbonate, magnesium oxide, lead oxide, barium oxide, titanium oxide, antimony oxide, magnesium carbonate, lead carbonate, zinc carbonate, barium carbonate, carbon black, graphite, alumina, calcium silicate, molybdenum disulfide, magnesium hydroxide, aluminosilicate, calcium metasilicate, and calcium sulfate. It is preferred that the foamed material of the invention have a dielectric strength at a 5 mil. thickness of material that is greater than 2 kilovolts.

The foamed product of the invention also includes a foamed material as above defined in the form of an insulating sheath on an electrical conducting wire.

A product of the invention is also the foamed material as above defined in the form of a cable jacket on a bundle of primary electrically insulated wires.

DETAILED DESCRIPTION OF THE INVENTION

The processing equipment required to practice the invention is conventional in nature and readily available. The ingredients comprising the recipe are first subjected to mixing in powder form in an intensive powder blender. Many different types of adequate powder blenders are commercially available. It is possible to pre-blend the nucleating agent and dispersing aid in the intensive powder blender prior to addition of the remainder of the recipe.

Melt compounding of the substantially homogeneous powder recipe blend is preferably done with a readily available twin screw high shear compounder. Such twin screw extruder means are likewise readily available commercially. Although other high shear melt compounding means are available it has been found that the twin screw configuration achieves a higher level of dispersion of the various ingredients of the recipe in a shorter period of time, while maintaining a melt temperature distribution less than the activation temperature of the blowing agent, than is achieved with other types of high shear melt compounders. After extrusion from the melt compounder at a temperature below the activation temperature of the blowing agent, the extruded material is quenched in a water bath and then preferably chopped to form pellets.

The foamable pellets can then subsequently be utilized in a conventional extruder fitted with an electrical wire insulation forming die means to provide coated electrical wire having an insulating sheath of the foamed PVDF material thereon.

Extrusion equipment requirements for the foamable PVDF pellets are similar to those for unmodified PVDF and no additional tooling or equipment modifications are needed. Extrusion of PVDF requires streamlined flow channels to prevent melt stagnation and subsequent discoloration or decomposition. Typical wire extrusion setup and conditions for the foamable PVDF pellets are shown in Table 1 infra.

Conventional screw designs of 24 L/D, 3-5:1 compression ratio, with sharp or gradual transition zones are suitable. A high metering zone temperature is employed to activate the foaming agent. The metering zone is preferred for the activation because the heat transfer to the melt is more effective and uniform, which leads to a more homogenous foam activation and cell structure in the foamed end product. The crosshead should be designed to minimize abrupt internal pressure drops and prevent premature bubble growth inside the die. Ideally, all foam growth should occur just outside the die to minimize open cell formation. Typically, dies with little or no land lengths are recommended for optimum foam structure. However, dies having moderately straight land lengths are satisfactory, particularly with small die orifices.

Typical of all foam wire operations, the quench rate, line speed, wire preheat, die tip temperature, and extrusion rpm have significant effects on the wall thickness, foam structure, and final properties. The qualitative effects of these variables are listed in Table 2 infra and must be adjusted according to the particular equipment setup and desired end product.

The foam structure, and hence properties, are highly dependent upon the processing conditions. PVDF can be processed to yield foamed structures with integrity at a density as low as 0.3 g/cc compared to 1.76 g/cc for the unfoamed PVDF. However, the dielectric strength decreases with a reduction in density. Cell size also influences the dielectric strength behavior, where a reduction in cell size leads to a higher dielectric strength. For a given insulation thickness, the density and cell size must be adjusted to give a suitable dielectric strength which meets the required product specifications.

Properties for a thin wall (0.007 in.) foamed insulation of 0.80 g/cc are presented in Table 3, infra. The insulation was processed using the equipment and conditions specified in Table 1. The foamed insulation has a dielectric constant of 3.6, comparable to that of PVC primary insulation used in long length telephone cables.

As is typical of foams, the foamed PVDF insulation exhibits improved flexibility as noted by the lower flexural modulus and strength. Tensile, and to a smaller extent, flexural strength decrease with decreasing density. The mechanical, as well as the electrical properties, also depend on the cell size; however, for the range of 0.0001 to 0.010-in. cell size, most of the mechanical properties tend to depend mainly on the density. A cable construction containing 24 pairs of foamed PVDF insulated primaries covered with an unfoamed PVDF jacket passed the flame spread and smoke emission requirements of the modified Steiner Tunnel Test (UL910).

TABLE 1
TYPICAL EQUIPMENT AND PROCESS CONDITIONS FOR KYNAR 468 FOAM WIRE INSULATION

| Extruder: | 1", 24 L/D |
|---|---|
| Screw: | ⅓ Feed, ⅓ Transition, ⅓ Metering 3.5:1 Compression |

TABLE 1-continued
TYPICAL EQUIPMENT AND PROCESS CONDITIONS FOR KYNAR 468 FOAM WIRE INSULATION

| Screen Pack: | 40/60/100 |
|---|---|
| Die Orifice: | 0.028" |
| Die Straight Land Length: | 0.045" |
| Conductor: | 24 AWG Solid Copper |

| Extruder | B1 | B2 | B3 | Gate | Cross head | Forming Die |
|---|---|---|---|---|---|---|
| Temperature Profile (°C.) | 210 | 220 | 285 | 230 | 230 | 200 |

| Screw RPM: | 50 |
|---|---|
| Line Speed: | 500 fpm |
| Die-Water Bath Distance: | 0.5" |

TABLE 2
GENERAL EFFECTS OF PROCESS VARIABLES ON CN KYNAR 468 FCAM STRUCTURE

| | | Responses | | |
|---|---|---|---|---|
| Process Variables | Change | Insulation Density | Cell Size | Wall Thickness |
| Line Speed | + | + | − | − |
| Die-Water Bath Distance | + | − | + | + |
| Extruder Speed | + | 0 | − (slight) | + |
| Wire Preheat Temp. | + | − | + | + |
| Mandrel Advance (In Die) | + | + | − | − |

KEY:
+ Increase
0 No significant change
− Decrease

TABLE 3
TYPICAL PROPERTIES OF KYNAR 468 FOAMED WIRE INSULATION

| | Test Method | Foam PVDF (KYNAR 468) | Virgin PVDF (KYNAR 460) |
|---|---|---|---|
| Wall Thickness ($\times 10^{-3}$ in) | — | 7 | 7 |
| Density (g/cc) | | .80 | 1.76 |
| Void Content (%) | | 55 | 0 |
| Avg. Cell Size ($\times 10^{-3}$ in) | 100 × mag. | 0.6–1.0 | — |
| Tensile Modulus (kpsi) | ASTM D638 | 140 | 290 |
| Tensile Break Strength (kpsi) | ASTM D638 | 1.8 | 6.3 |
| Tensile Break Elongation (%) | ASTM D638 | 50–80 | 100–400 |
| Flexural Modulus (kpsi) | ASTM D790 | 135 | 290 |
| Dielectric Constant 100 Hz | ASTM D1673 | 3.6 | 8.2 |
| Dielectric Strength (V/mil) | ASTM D149 | 560 | 2230 |
| Insulation Resistance (megohm/1000 ft) | ASTM D3032 | 200–300 | 850 |

EXAMPLE 1

A foamed homopolymer of PVDF is prepared as follows:

| Recipe: Material | % by Wt. |
|---|---|
| Polymer - PVDF homopolymer sold by Pennwalt Corporation under the trademark Kynar ® 461 | 95% |
| Nucleating Agent (CaCO₃ in snowflake form) | 1.0 |
| Dispersing aid (dibutylphthalate) | 3.0 |
| Blowing Agent, diisopropyl hydrazodicarboxylate, sold by Uniroyal, Inc. under trademark Celogen ® HT500 (Activation temperature, observed in | 1.0 |

| Recipe: Material | % by Wt. |
|---|---|
| KYNAR blend 240°–250° C.) | |

The above recipe is then mixed in an intensive powder blender to provide a substantially homogeneous powder blend.

The mixed recipe is then melt blended in a high shear twin screw extruder at 200 rpm and a 200° C. melt temperature to provide adequate dispersing of the recipe blend ingredients, while maintaining the temperature at a level below the activation temperature of the blowing agent. The melt blended recipe is then extruded, quenched in a water bath, and then chopped to form foamable pellets.

The foamable pellets are then extruded as a sheath onto wire to form insulated wire under the conditions set forth in Example 3, infra. The wall thickness of the foamed sheath is 0.007 in. with a density of 0.80 g/cc and a dielectric strength of greater than 400 v./mil. The void content is 55% and the average cell size (determined at 100× magnification) is 0.0006 to 0.0010 inch. The remainder of the properties are as set forth in Table 3.

EXAMPLE 2

Foamed copolymers were prepared from PVDF copolymers containing a minimum of 70 pph vinylidene fluoride units with hexafluoropropylene and/or tetrafluoroethylene, sold under the respective trademarks Kynar Flex 2800 ™ and KYNAR 7200 by Pennwalt Corporation. The following conditions were used:

| Recipe: | |
|---|---|
| KYNAR Flex 2800 or KYNAR 7200 | 93.5% by weight |
| Celogen ® HT500 (Trademark of Uniroyal, Inc.) | 2.5 |
| CaCO₃ (Snowflake) | 1.0 |
| Dibutylphthalate | 3.0 |

The above ingredients were blended for 30 minutes in a moderate intensity powder blender. The KYNAR 2800 and KYNAR 7200 foamable blends were then compounded and pelletized using a twin screw extruder under the following conditions.

| Barrel Zone | | | | | | | |
|---|---|---|---|---|---|---|---|
| 1 | 2 | 3 | 4 | 5 | 6 | Die | Screw RPM |
| 250° F. | 350 | 390 | 390 | 390 | 390 | 390 | 200 |

The pellets were then mixed with 2% violet concentrate (KYNAR color concentrate Type K-50087 available from Pennwalt Corporation) and processed into foamed wire insulation under the conditions stated below:

| 1 Inch Extruder 24/1 L/D | | | | | | |
|---|---|---|---|---|---|---|
| | Extruder Zone | | | | | |
| | 1 | 2 | 3 | Gate | Cross-head | Forming Die |
| | 210° C. | 230 | 285 | 230 | 230 | 220 |
| Conductor: | 24 AWG Copper | | | | | |
| Screw Speed: | 50 rpm | | | | | |
| Line Speed: | 400 fpm | | | | | |
| Die Water Bath | | | | | | |

| 1 Inch Extruder 24/1 L/D | | |
|---|---|---|
| Distance: 2" | | |
| Foam Insulation Properties: | KYNAR 2800 blend | KYNAR 7200 blend |
| Wall (×10⁻³ in) | 9.5 | 8 |
| Density (g/cc) | 1.17 | 1.08 |
| Dielectric Strength (v/mil) | 150 | 320 |

Similar results are obtained with copolymers of PVDF and hexafluoropropylene and tetrafluoroethylene, respectively.

EXAMPLE 3

The foamable pellets of Example 1 were tumble blended with 5% by weight PMMA (Plexiglass vs 100 pellets, available from Rohm and Hass Co.). The blend was extruded and coated onto 24 AWG copper conductor under the following conditions.

| 1 Inch Extruder (24/1: L/D) | | | | | | |
|---|---|---|---|---|---|---|
| | Extruder Zone % | | | | | |
| | 1 | 2 | 3 | Gate | Cross-head | Forming Die |
| | 210 | 230 | 285 | 240 | 240 | 230 |
| Conductor: | 24 AWG | | | | | |
| Screw Speed: | 50 rpm | | | | | |
| Line Speed: | 500 fpm | | | | | |
| Die-Water Bath Distance: | 2" | | | | | |
| Foam Insulation Properties: | Foamable PVDF of Example 1 Control | | | Foamable PVDF of Example 1 with 5% PMMA | | |
| Wall (×10⁻³ in) | 6 | | | 7 | | |
| Density (g/cc) | 1.01 | | | 1.10 | | |
| Dielectric Strength (v/mil) | 283 | | | 486 | | |

The process conditions were run in a manner which gave the unmodified PVDF foam a dielectric strength less than 2 kv in order to emphasize the effect of PMMA, which in this example, increases the dielectric strength well above the 2 kv requirement.

EXAMPLE 4

A foamed PVDF Jacket Insulation, suitable for encasing a group of insulated primary wire, was prepared from a foamable PVDF prepared according to Example 1.

The extruder conditions were as follows:

| 1 inch extruder, cable crosshead - pressure type | | | | | | |
|---|---|---|---|---|---|---|
| Temperature Profile | | | | | | |
| | B1 | B2 | B3 | Gate | Crosshead | Die Tip |
| | 200° C. | 230 | 280 | 230 | 230 | 300 |
| Extruder Speed: | 46 rpm | | | | | |
| Line Speed: | 20 fpm | | | | | |
| Gate Pressure: | 4000 psi | | | | | |

The foamed jacket insulation formed had a density of 0.80 g/cc and a wall thickness of 65 mils. Such a jacket has the advantages of greater flexibility, lower weight, and lower material cost over conventional jackets.

Similar results are obtainable with polymers consisting essentially of a homopolymer of polyvinylidene fluoride, copolymers or terpolymers containing a major portion of vinylidene fluoride with at least one copolymerizable monomer selected from the group consisting essentially of hexafluoropropylene, trifluoroethylene, chlorotrifluoroethylene and tetrafluoroethylene and mixtures of the homopolymer, copolymer, and terpolymer.

Other suitable dispersing aids include: dialkyl phthalate, dibutoxyethyl phthalate, diisononyl phthalate, ditridecyl phthalate, dicyclohexyl phthalate, diphenyl akyl adipate, methyl phthalyl ethyl glycolate, and diethylene glycol monobutyl ether.

Similar results are achieved with other nulceating agents, including: calcium carbonate, magnesium oxide, lead oxide, barium oxide, titanium oxide, antimony oxide, magnesium carbonate, lead carbonate, zinc carbonate, barium carbonate, carbon black, graphite, alumina, calcium silicate, molybdenum disulfide, magnesium hydroxide, aluminosilicate, calcium metasilicate, and calcium sulfate.

Other suitable blowing agents include those compounds having the formula ROOC—HN—NH—COOR' wherein at least one of R and R' is selected from the group consisting of secondary and tertiary alkyl groups having from 3 to 5 carbon atoms and the other of R and R' is selected from the group consisting of straight-chain and branched-chain alkyl groups having from 1 to 8 carbon atoms, cycloalkyl radicals having from 5 to 8 carbon atoms, aryl radicals having from 6 to 10 carbon atoms, and alkaryl and aralkyl radicals having from 7 to 10 carbon atoms.

I claim:

1. A method for producing a foamable polyvinylidene fluoride material suitable for forming foamed electrical wire insulation having a dielectic constant of less than about 5.0, comprising:

(a) blending in an intensive powder blender a mixture of
      (i) a polymer selected from the group of polymers consisting essentially of a homopolymer of polyvinylidene fluoride, copolymers or terpolymers containing a major portion of vinylidene fluoride with at least one copolymerizable monomer selected from the group consisting essentially of hexafluoropropylene, trifluoroethylene, chlorotrifluoroethylene and tetrafluoroethylene and mixtures of the homopolymer, copolymer, and terpolymer;
      (ii) 0.05 to 5.0 percent by weight of the polymer of (i) of a nucleating agent of discreet, insoluble particles having a size distribution whose average length in the longest dimension of less than about 5 microns;
      (iii) 0.05 to 5.0 percent by weight of the polymer of (i) of a blowing agent having an activation temperature that is above the melting point of said polymer but below the decomposition temperature of said polymer;
      (iv) 0.05 to 5.0 percent by weight of the polymer of (i) of a dispersing aid selected from the group consisting of dialkyl phthalate, dibutoxyethyl phthalate, diisononyl phthalate, ditridecyl phthalate, dicyclohexyl phthalate, diphenyl alkyl adipate, methyl phthalyl ethyl glycolate, and diethylene glycol monobutyl ether;
      to provide a substantially homogeneous powdered mixture;

(b) melt compounding the substantially homogeneous powdered mixture of (a) with high shear melt compounding means while maintaining the temperature of the mixture below the activation temperature of the blowing agent to provide a substantially homogeneous melted blend of the mixture of (a); and then (c) extruding and quenching the melted mixture of (b) to provide the foamable polyvinylidene fluoride material.

2. The method as defined in claim 1 wherein in (a)(i) the polymer includes at least 70 mole percent of polyvinylidene fluoride monomer units.

3. The method as defined in claim 1 wherein in (a)(ii) the size distribution of average lengths of the nucleating agent is less than about 2 microns length in the longest dimension.

4. The method as defined in claim 1 wherein in (a)(ii) said nucleating agent is selected from the group consisting essentially of calcium carbonate, magnesium oxide, lead oxide, barium oxide, titanium oxide, antimony oxide, magnesium carbonate, lead carbonate, zinc carbonate, barium carbonate, carbon black, graphite, alumina, calcium silicate, molybdenum disulfide, magnesium hydroxide, aluminosilicate, calcium metasilicate, and calcium sulfate.

5. The method as defined in claim 1 wherein the nucleating agent is calcium carbonate.

6. The method as defined in claim 1 wherein said blowing agent in (a)(iii) is present in an amount of less than 3.0 percent by weight of the polymer.

7. The method as defined in claim 1 wherein the blowing agent in (a)(iii) has an activation temperature greater than 220° C.

8. The method as defined in claim 1 wherein the blowing agent of (a)(iii) is diisopropyl hydrazodicarboxylate.

9. The method as defined in claim 1 wherein the dispersing aid of (a)(iv) is dibutyl phthalate or dioctyl phthalate.

10. The method as defined in claim 1 wherein the blowing agent in (a)(iii) is a compound having the formula ROOC—HN—NH—COOR' wherein at least one of R and R' is selected from the group consisting of secondary and tertiary alkyl groups having from 3 to 5 carbon atoms and the other of R and R' is selected from the group consisting of straight-chain and branched-chain alkyl groups having from 1 to 8 carbon atoms, cycloalkyl radicals having from 5 to 8 carbon atoms, aryl radicals having from 6 to 10 carbon atoms, and alkaryl and aralkyl radicals having from 7 to 10 carbon atoms.

11. The method as defined in claim 1 wherein in (a) the nucleating agent of (a)(ii) and the dispersing aid of (a)(iv) are pre-blended prior to forming the mixture of (a).

12. The method as defined in claim 1 wherein in (b) twin screw compounding means are used for melt compounding the substantially homogeneous powdered mixture of (a).

13. The method as defined in claim 1 wherein after step (c) the foamable polyvinylidene fluoride material is then chopped to form pellets.

14. The method as defined in claim 1 wherein the nucleating agent of (a)(ii) is calcium carbonate, the blowing agent of (a)(iii) is diisopropyl hydrazodicarboxylate, and the dispersing aid of (a)(iv) is dibutyl phthalate.

15. The method as defined in claim 1, 2, 3, 4, 5, 6, 7, 8, 9, 10, 11, 12, 13, or 14 wherein after step (c) the material is heated under sufficient pressure to prevent foaming to a temperature of at least the activation temperature of the blowing agent and then releasing the pressure to provide foamed material.

16. The method as defined in claim 1, 2, 3, 4, 5, 6, 7, 8, 9, 10, 11, 12, 13, or 14 wherein after step (c) the foamable material is heated to a temperature of at least the activation temperature of the blowing agent under sufficient pressure to prevent foaming in an extruder and the heated material is extruded through an electrical wire coating die to provide an insulated wire having an electrical insulating sheath of foamed material on the wire.

* * * * *